(12) United States Patent
Casadio et al.

(10) Patent No.: US 9,200,977 B2
(45) Date of Patent: Dec. 1, 2015

(54) COUPLING FOR ROTOR BALANCING (75) Inventors: Stefano Casadio, Florence (IT); Sergio Palomba, Florence (IT); Giovanni Ballerini, Impruneta (IT); Adriano Grossi, Florence (IT)

(73) Assignee: Nuovo Pignone S.P.A., Florence (IT)

( * ) Notice: Subject to any disclaimer, the term of this patent is extended or adjusted under 35 U.S.C. 154(b) by 283 days.

(21) Appl. No.: 13/514,498

(22) PCT Filed: Dec. 9, 2010

(86) PCT No.: PCT/EP2010/069248
§ 371 (c)(1),
(2), (4) Date: Oct. 22, 2012

(87) PCT Pub. No.: WO2011/070100
PCT Pub. Date: Jun. 16, 2011

(65) Prior Publication Data
US 2013/0111989 A1    May 9, 2013

(30) Foreign Application Priority Data
Dec. 10, 2009    (IT) .............................. CO2009A0062

(51) Int. Cl.
*G01M 1/16*    (2006.01)
*G01M 1/06*    (2006.01)
(Continued)

(52) U.S. Cl.
CPC ................. *G01M 1/06* (2013.01); *F01D 5/027* (2013.01); *F01D 25/285* (2013.01); *F16D 1/033* (2013.01); *F16D 1/04* (2013.01); *F16D 1/076* (2013.01);
(Continued)

(58) Field of Classification Search
CPC ............... E04H 6/42; F16D 1/04; G01M 1/06
USPC ................... 73/460, 462; 29/525.11; 403/376
See application file for complete search history.

(56) References Cited

U.S. PATENT DOCUMENTS 2,712,741 A * 7/1955 Roller .............................. 464/95
4,055,966 A * 11/1977 Fredericks ....................... 464/99
(Continued)

FOREIGN PATENT DOCUMENTS

EP    1445484 A1    8/2004
EP    1638942 A2    7/2006
(Continued)

OTHER PUBLICATIONS

Search Report and Written Opinion for corresponding International Application No. PCT/EP2010/069248, dated Apr. 7, 2011.
(Continued)

*Primary Examiner* — Laura Martin
*Assistant Examiner* — Samir M Shah
(74) *Attorney, Agent, or Firm* — GE Global Patent Operation (57) ABSTRACT

Systems, devices and methods according to these exemplary embodiments provide couplings or interfaces usable, for example, in the high speed balance testing of rotors are provided. A coupling includes a main body portion having an extended thin portion therein which is configured to fit a shaft of the balancing machine and an extended insert portion which is configured to fit an opening in the rotor. A plurality of connection elements is disposed in holes in the main body portion of the coupling and a ring is disposed over the extended insert and proximate exits of the holes in the main body portion.

14 Claims, 6 Drawing Sheets

(51) Int. Cl.

| | |
|---|---|
| *F01D 5/02* | (2006.01) |
| *F01D 25/28* | (2006.01) |
| *F16D 1/033* | (2006.01) |
| *F16D 1/076* | (2006.01) |
| *F16D 1/04* | (2006.01) |
| *F16D 1/06* | (2006.01) |
| *E04H 6/42* | (2006.01) |

(52) U.S. Cl.
CPC ........... *E04H 6/42* (2013.01); *F05D 2260/4023* (2013.01); *F16D 2001/062* (2013.01); *Y10T 29/49963* (2013.01); *Y10T 403/7075* (2013.01)

(56) References Cited

U.S. PATENT DOCUMENTS

| | | | | |
|---|---|---|---|---|
| 4,214,457 | A * | 7/1980 | Wade et al. | 464/99 |
| 4,335,963 | A * | 6/1982 | Jameson et al. | 366/63 |
| 4,708,514 | A * | 11/1987 | Walter et al. | 403/372 |
| 5,019,015 | A * | 5/1991 | Wasserfuhr | 464/99 |
| 5,472,073 | A * | 12/1995 | Hay | 192/69.6 |
| 6,213,883 | B1 * | 4/2001 | Giere | 464/99 |
| 6,554,713 | B2 * | 4/2003 | Sunada et al. | 464/99 |
| 6,648,540 | B2 * | 11/2003 | Brisson et al. | 403/16 |
| 6,968,747 | B2 * | 11/2005 | Chen | 73/854 |
| 7,069,654 | B2 | 7/2006 | Robbins | |
| 8,689,455 | B2 * | 4/2014 | Smith et al. | 33/412 |
| 2005/0066712 | A1 * | 3/2005 | Chen | 73/65.03 |
| 2005/0277480 | A1 * | 12/2005 | Breese | 464/179 |

FOREIGN PATENT DOCUMENTS

| | | |
|---|---|---|
| FR | 2367943 A1 | 5/1978 |
| JP | 62203432 U | 12/1987 |
| JP | 2000275131 A | 10/2000 |
| JP | 2005249599 A | 9/2005 |
| RU | 2204739 C2 | 5/2003 |

OTHER PUBLICATIONS

Search Report and Written Opinion for corresponding Italian Application No. CO2009A000062, dated Jul. 26, 2010.

Boynton, Richard. "A New Moment Balance Machine for Turbine Blade Measurement", 54th Annual Conference of Society of Allied Weight Engineers, Inc. May 22-24, 1995, pp. 1-19.

KZ Office Action dated Dec. 28, 2013, issued in connection with corresponding Application No. 2012/1568.1.

Unofficial English Translation of Japanese Office Action and Search Report issued in connection with corresponding JP Application No. 2012-542547 on Sep. 26, 2014.

* cited by examiner

COUPLING FOR ROTOR BALANCING

CROSS REFERENCE TO RELATED APPLICATIONS

This is a national stage application under 35 U.S.C. §371(c) of prior-filed, co-pending PCT patent application Ser. No. PCT/EP2010/069248, filed on Dec. 9, 2010, which claims priority to Italian Patent Application Serial No. CO2009A000062, filed on Dec. 10, 2009, the entire contents of which are incorporated herein by reference.

BACKGROUND OF THE INVENTION

1. Field of the Invention

Embodiments of the present invention relate generally to couplings between equipment and, more specifically, to a coupling or interface between a rotor and a balancing test machine.

2. Description of the Related Art

Turbo machines (also sometimes called "turbo rotating machines") are a class of machines which include compressors, turbine engines, and the like, and which include rotors that, in operation, rotate at very high speeds, e.g., thousands or tens of thousands of revolutions per minute (RPMs). The rotor typically includes a shaft that is supported axially and radially for rotation in bearings. Given the size and weight of such rotors, even a small unbalance in a rotor can greatly reduce the number of operational hours for a turbo machine. For example, for a rotor having a weight of 500 pounds and an unbalance (e.g., center of gravity offset) of a mere 0.001 inch, the force resulting from the unbalance would be about 2000 pounds when the rotor is rotated at 12,000 RPM, which force is observed as vibrations that can rapidly ruin the bearings.

One way to address this problem is to balance test the rotors either as they are being assembled in stages or after they are completely assembled, and then to make adjustments to compensate for any detected unbalance. Such balance tests may be performed by connecting the rotors or rotor stages to a balancing test equipment which rotates the rotor under vacuum at high speed and has sensors, which detect imbalances, e.g., center of gravity offsets, during rotation.

Figure 1:
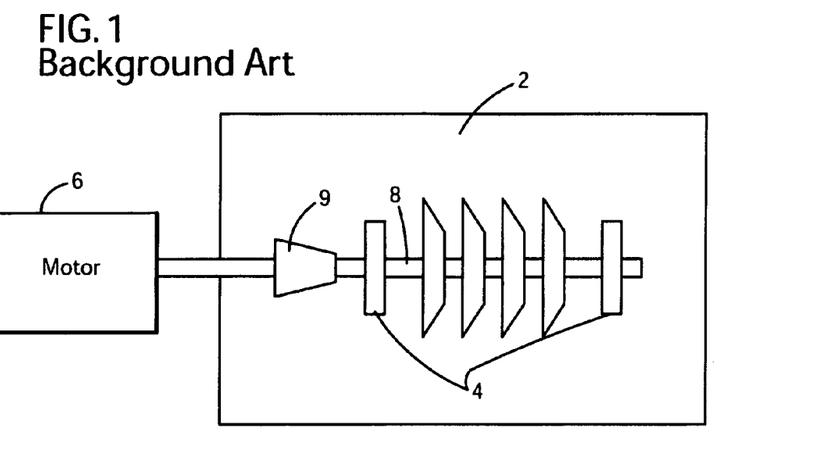
FIG. 1 illustrates a generalized rotor balance testing setup.
Figure 2:
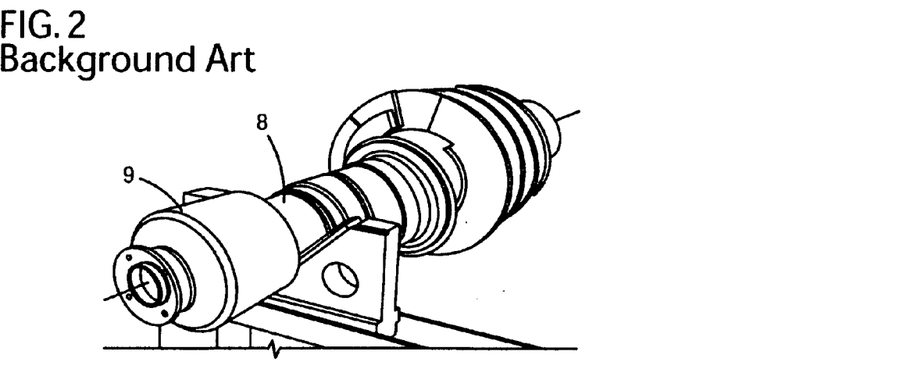
FIG. 2 depicts a conventional coupling for the balance testing setup of FIG. 1.

A generalized high speed balancing test configuration is shown in FIG. 1. Inside a vacuum chamber 2, the pedestals 4 support a rotor 8 and a motor 6 of the balance testing machine is connected to the rotor 8 to be tested via a coupling or interface 9. In addition to a shaft, the rotor 8 may also have one or more elements coupled to the shaft, e.g., one or more impellers as described below. The coupling 9 transfers torque from the motor 6 to the rotor 8 and is provided as an element in the test system since there are typically many different sizes and configurations of rotors 8 to be balance tested by the balance testing machine and, therefore, the coupling 9 operates as an adapter between the various rotors 8 to be tested and the balance testing machine. An exemplary coupling 9 is shown in FIG. 2. Therein, it can be seen that the coupling 9 has a generally conical shape which tapers toward the end which fits onto the rotor 8, and has a relatively large diameter relative to the rotor 8. In practice, the coupling 9 is heat shrunk onto the rotor 8 prior to balance testing, and then removed for assembly into its respective turbo machine.

The use of such a coupling 9 as part of the balance testing process brings with it a number of drawbacks. The coupling 9 is relatively heavy, e.g., on the order of 20-30 kg, so that any eccentricity which it possesses makes the resulting unbalance that it adds to the testing system large enough to adversely affect balance testing, thereby potentially resulting in an unbalanced rotor 8. In fact, in some cases, the magnitude of the unbalance added by the coupling 9 may reach 200% of the acceptable unbalance tolerance for the rotor 8. Additionally, the method of attaching the coupling 9 to the rotor, i.e., heat shrinking, is time consuming, complex and may damage the rotor surface itself.

Accordingly, it would be desirable to design and provide a coupling for a rotor to a balance testing machine which overcomes the aforementioned drawbacks of existing couplings.

BRIEF SUMMARY OF THE INVENTION

Systems, devices and methods according to these exemplary embodiments provide couplings or interfaces usable, for example, in the balance testing of rotors.

According to an exemplary embodiment, a coupling comprising a main body portion having an extended thin portion therein, which is configured to fit a shaft of the balancing machine and an extended insert portion, which is configured to fit an opening in the rotor. A plurality of connection elements is disposed in holes in the main body portion of the coupling and a ring is disposed over the extended insert and proximate exits of the holes in the main body portion.

According to another exemplary embodiment, a method for connecting a rotor to a balance testing includes: inserting an extended insert portion of a coupling device into an opening in the rotor, applying a torque to a plurality of connection elements, which plurality of connection elements are disposed in a main body portion of the coupling device, to force a ring disposed over the extended insert portion against a mating surface around the opening of the rotor, and connecting a drive shaft of the balance testing machine to an extended thin portion in the main body portion of the coupling device.

According to yet another exemplary embodiment, a balance testing system comprising a balance test machine including a drive shaft, a coupling, connected on one side to the drive shaft, and a rotor, connected to receive torque from the drive shaft via the coupling, the coupling comprises: a main body portion having an extended thin portion therein which is configured to fit the drive shaft of the balance test machine and an extended insert portion which is configured to fit an opening in the rotor, a plurality of connection elements disposed in holes in the main body portion, and a ring disposed over the extended insert and proximate exits of the holes in the main body portion.

BRIEF DESCRIPTION OF THE DRAWINGS

The accompanying drawings illustrate exemplary embodiments, wherein.

DETAILED DESCRIPTION OF THE INVENTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 3:
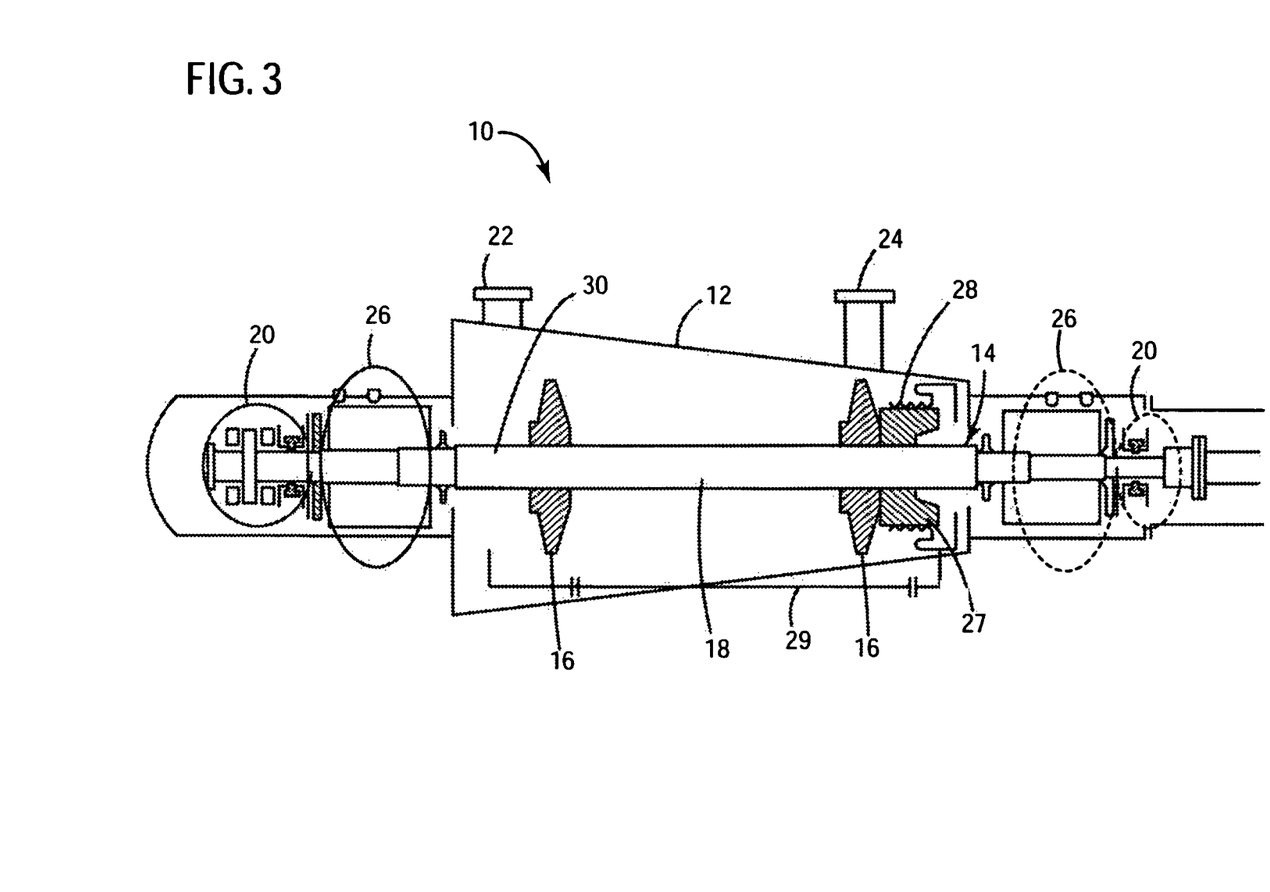
FIG. 3 depicts a compressor having a rotor which is balance tested in accordance with exemplary embodiments.

To provide some context for the subsequent discussion relating to couplings according to exemplary embodiments discussed herein, FIG. 3 schematically illustrates a multistage, centrifugal compressor 10 which includes a rotor that is, preferably, balance tested (and then balanced) prior to final manufacture and entry into service. Therein, the compressor 10 includes a box or housing (stator) 12 within which is mounted a rotating compressor shaft 14 that is provided with a plurality of centrifugal impellers 16. The rotor assembly 18 includes the shaft 14 and impellers 16 and is supported radially and axially through bearings 20 which are disposed on either side of the rotor assembly 18.

The multistage centrifugal compressor operates to take an input process gas from duct inlet 22, to accelerate the particles of the process gas through operation of the rotor assembly 18, and to subsequently deliver the process gas through outlet duct at an output pressure which is higher than its input pressure. Between the impellers 16 and the bearings 20, sealing systems 26 are provided to prevent the process gas from flowing through to the bearings 20. In the exemplary embodiment illustrated, the housing 12 is configured so as to cover both the bearings 20 and the sealing systems 26 to prevent the escape of gas from the centrifugal compressor 10. Also seen in FIG. 3 is a balance drum 27, which compensates for axial thrust generated by the impellers 16, the balance drum's labyrinth seal 28 and a balance line 29, which maintains the pressure on the outboard side of the balance drum 27 at the same level as the pressure at which the process gas enters via duct 22. It will be appreciated by those skilled in the art that the centrifugal compressor illustrated in FIG. 3 is provided here merely as an example of one type of turbo machine which includes the type of rotor that is typically balance tested prior to being completely assembled, and that the present invention is not limited thereto.

Figure 4:
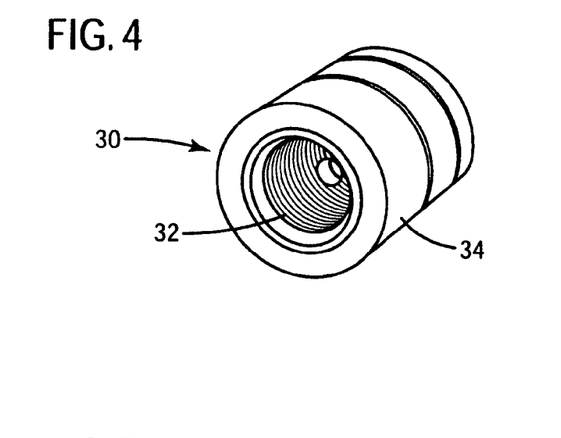
FIG. 4 shows an end of a rotor to be balance tested in accordance with exemplary embodiments.

An end 30 of the rotor assembly 18 shown in FIG. 3(a) can, for example, be configured as seen in FIG. 4. Therein, it can be seen that the rotor end 30 is generally circular in cross section with an opening 32 and a generally cylindrical outer surface 34. According to one exemplary embodiment illustrated in FIG. 5, a coupling 40 is designed for interfacing the rotor end 30 with a balance test machine. Therein, the coupling 40 includes an extended insert 42, a ring 44 and a main body portion 46 having a plurality of connection elements, e.g., torque screws, 48 disposed therein. The main body portion 46 has an opening 50 formed therein which is configured to mate with a drive shaft (not shown in this Figure, see FIG. 6 described below) of the balance test machine. In this example, the opening 50 is a hexagonally shaped opening although those skilled in the art will appreciate that the opening 50 can take any desired shape depending upon the balance test machine implementation. The main body portion 46 according to this exemplary embodiment has an extended thin portion 51 therein which is configured to mate with a drive shaft 55 (seen in FIG. 6) of the balance test machine.

Figure 6:
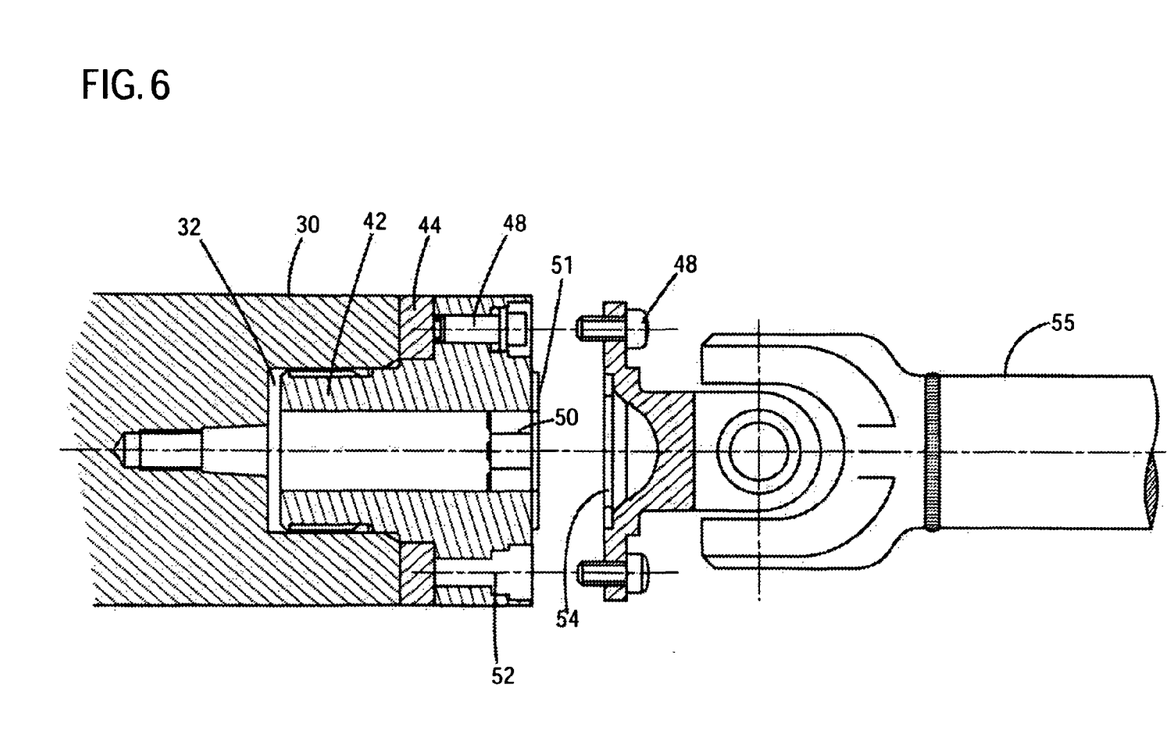
FIG. 6 shows a sectional view of the coupling of FIG. 4(a) attached to a rotor according to an exemplary embodiment.

A side sectional view of the coupling 40 when connected to a rotor end 30 is provided as FIG. 6. Therein, one of the torque screws 48 is removed to better reveal its corresponding threaded screw hole 52. In this example, the coupling 40 has six torque screws 48 which are evenly (symmetrically) spaced around the circumference of the main body portion 46 in corresponding screw holes 52, although those skilled in the art will recognize that both the number and placement of the torque screws 48 may be varied. As seen in FIG. 4(b), the ends 54 of the torque screws 48 abut the ring 44 which rests on the coupling 40. The ring 44 rests on the surface of the main body portion 46 without attachment according to this exemplary embodiment and is pressured by the torque screws 48. The ring 44 provides uniform pressure so that friction is evenly transmitted on the rotor end and avoids rotor end damage by the screws 48. According to one exemplary embodiment, the torque screws 48 can be formed from a material having a tensile strength of 700 MPa, although other values and materials may also be used.

Figure 7:
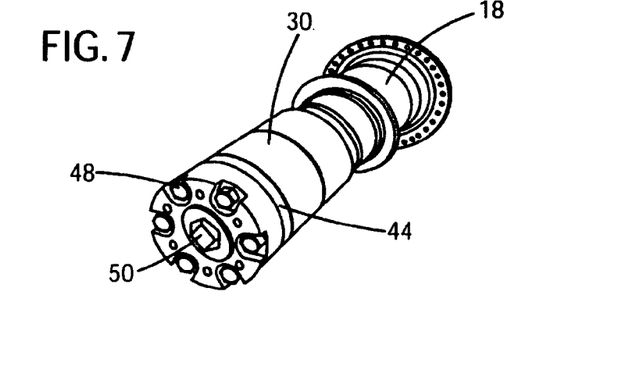
FIG. 7 is an exterior perspective view of a coupling connected to a rotor according to an exemplary embodiment.

To attach the coupling 40 to the rotor, the extended insert 42 is first inserted into the opening 32 in the rotor end 30. For example, the extended insert 42 can be threaded and screwed into corresponding threads provided in the opening 32 in the rotor end 30 using a hexagonal torque key in the opening 50. Then, the torque screws 48 can be tightened, e.g., using a dynamometer key and applying 2-5 N-m of torque, so that the ring 44 is pressed up against the outer surface 34 of the rotor end 30. Thus, according to this exemplary embodiment, the coupling 40 is friction fit to the rotor and torque is transmitted from the balance testing machine through the coupling 40 to the rotor through the friction connection. In this exemplary embodiment, the shaft 55 of the balance testing machine is connected to the coupling 40 by way of an opening 54 which mates with the extended thin (annular) portion 51 of the coupling. This exemplary attachment feature has the further advantage of maintaining concentricity of the coupling (to reduce/eliminate unbalance in the test setup). FIG. 7 depicts the combined rotor and coupling 40 after they are attached to one another according to this exemplary embodiment.

Figure 5:
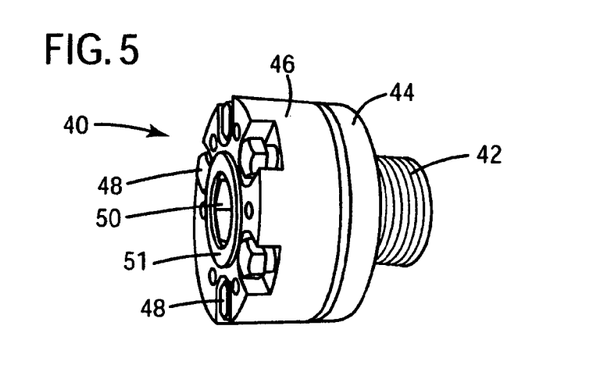
FIG. 5 shows a coupling device according to an exemplary embodiment.

Thus, unlike the conical, heat-shrunk coupling 14 which was described above with respect to FIG. 2, the coupling 40 according to the exemplary embodiments of FIGS. 5-7 can be easily and mechanically attached to a rotor to be balance tested. This process is both less time consuming and safer as it does not involve using a furnace to heat shrink the coupling onto a rotor. Additionally, the exemplary coupling 40 is less likely to damage the surface of the rotor than heat shrinking. Moreover, the coupling 40 can be manufactured to weigh less than coupling 14 and introduce less unbalance into the system.

Figure 8:
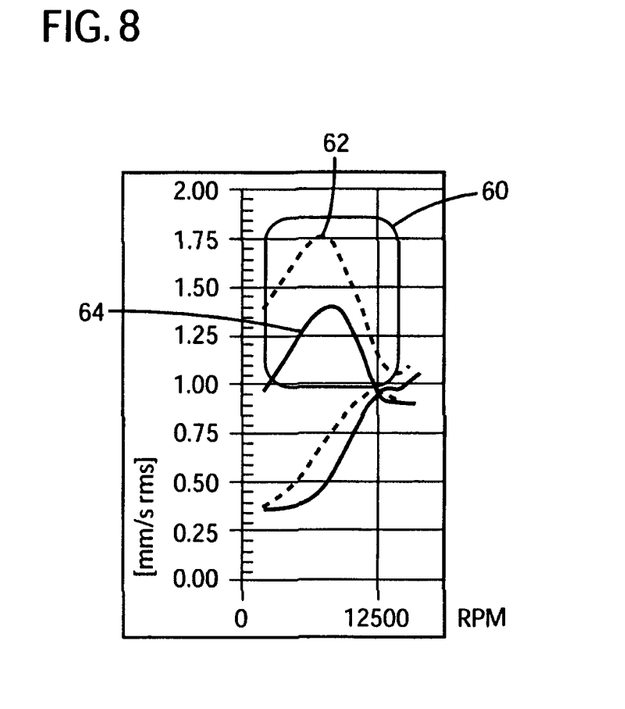
FIG. 8 is a graph showing vibration associated with a rotor tested using a coupling of the type illustrated in FIG. 2 as compared to the same rotor tested using a coupling according to exemplary embodiments.

For example, a test was run by balancing a rotor first using the coupling 14 to attach a rotor to the balance testing machine, and subsequently using the coupling 40 to attach the same rotor to the balance testing machine, results of which are plotted in FIG. 8. This test was performed using high speed balance equipment from Schenck GMBH which was generally setup as shown in FIG. 1 and which employed accelerometers as vibration sensors. To generate the results shown in FIG. 8, vibration of the rotor was measured at both the drive end of the rotor, i.e., the end of the rotor connected to the coupling (results enclosed in rectangle 60) and the opposite end of the rotor (results depicted below the rectangle 60) in units of mm/s rms vibration as a function of RPMs. More specifically, the dotted line 62 represents the measured vibration of the rotor connected to the balancing machine via coupling 14, while the solid line 64 represents the measured vibration of the rotor connected to the balance test machine via coupling 40. Comparing the two functions 62 and 64, it can be seen that vibration was markedly less, e.g., by about 25% at peak vibration levels, when using the coupling 40 according to the afore-described exemplary embodiments, than when using the coupling 14. Vibration differential on the other side of the drive was less significant, as expected, since that end of the drive is further away from the interface with the balance test system.

Figure 9:
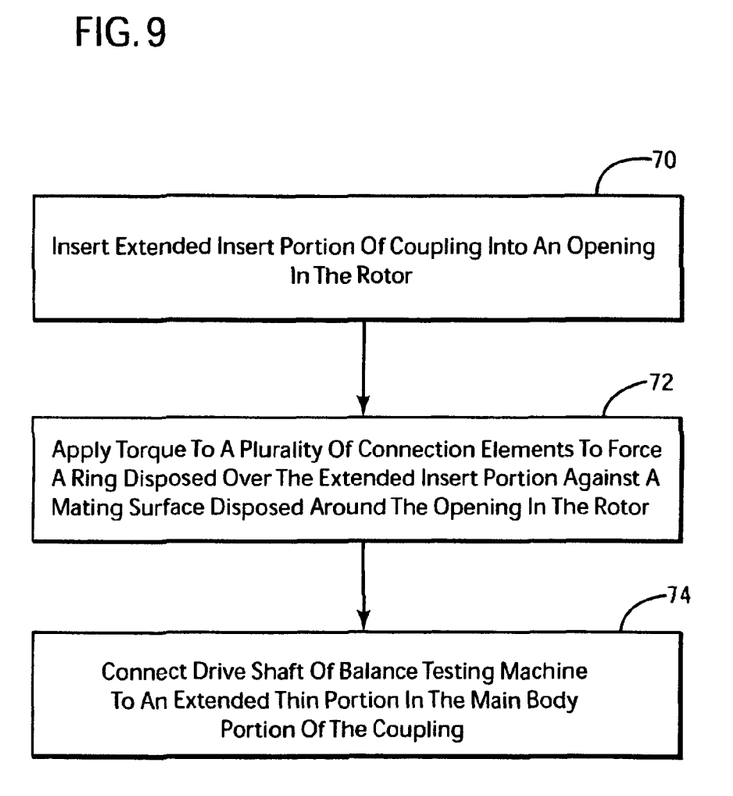
FIG. 9 is a flowchart illustrating a method of connecting a rotor to a test balance machine according to an exemplary embodiment.

Thus, according to one exemplary embodiment, a method for connecting a rotor to a balance testing includes the steps illustrated in the flowchart of FIG. 9. Therein, an extended insert portion of a coupling device is inserted into an opening in the rotor 70. Torque is applied to a plurality of connection elements to force a ring disposed over the extended insert portion against a mating surface disposed around the opening of the rotor 72. A drive shaft of the balance testing machine is connected to an extended thin portion in the main body portion of the coupling device 74.

The above-described exemplary embodiments are intended to be illustrative in all respects, rather than restrictive, of the present invention. Thus, the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A coupling for connecting a rotor to a balancing test machine, the coupling comprising:
    a main body portion having, an extended thin portion therein which is configured to fit a shaft of the balancing test machine and an extended insert portion which is configured to fit an opening in the rotor;
    a plurality of connection elements disposed in holes in the main body portion; and
    a ring disposed over the extended insert portion between the main body portion and an end of the rotor, wherein the plurality of connection elements operate to push the ring outwardly toward an end of the extended insert portion to create a friction fit between the coupling and the rotor to transmit torque from the balancing test machine through the coupling and to the rotor;
    wherein the coupling rigid.

2. The coupling of claim 1, wherein each of the plurality of connection elements is disposed in a recessed hole in the main body portion.

3. The coupling of claim 1, wherein the connection elements are screws.

4. The coupling of claim 3, wherein the holes for the screws are disposed symmetrically about a circumference of the main body portion.

5. The coupling of claim 1, wherein the main body portion and the ring are formed as cylinders having a substantially same diameter and the extended insert portion is a cylinder having a smaller diameter than that of the main body portion and the ring.

6. A method for connecting a rotor to a balance testing machine, the method comprising:
    inserting an extended insert portion of a coupling device into an opening in the rotor:
    applying a torque to a plurality of connection elements, which plurality of connection elements are disposed in a main body portion of the coupling device, to force a ring disposed over the extended insert portion between the main body portion and an end of the rotor; and
    connecting a drive shaft of the balance testing machine to an extended thin portion in the main body portion of the coupling device using the plurality of connection elements to push the ring outwardly toward an end of the extended insert portion to create a friction fit between the coupling and the rotor to transmit torque from the balance testing machine through the coupling and to the rotor,
    wherein the coupling is rigid.

7. The method of claim 6, wherein each of the plurality of connection elements is disposed in a recessed hole in the main body portion.

8. The method of claim 6, wherein the main body portion and the ring are formed as cylinders having a substantially same diameter and the extended insert portion is a cylinder having a smaller diameter than that of the main body portion and the ring.

9. A balance testing system comprising:
    a balance test machine including a drive shaft;
    a coupling, connected on one side to the drive shaft; and
    a rotor, connected to receive torque from the drive shaft through the coupling,
    the coupling comprising:
        a main body portion having an extended thin portion therein which is configured to fit the drive shaft of the balance test machine and an extended insert portion which is configured to lit an opening in the rotor;
        a plurality of connection elements disposed in holes in the main body portion; and
        a ring disposed over the extended insert portion between the main body portion and an end of the rotor, wherein the plurality of connection elements operate to push the ring outwardly toward an end of the extended insert portion to create a friction fit between the coupling and the rotor to transmit torque from the balance testing machine through the coupling and to the rotor;
        wherein the coupling is rigid.

10. The balance testing system of claim 9, wherein the connection elements are operable to push the ring outwardly toward an end of the extended insert portion.

11. The balance testing system of claim 9, wherein each of the plurality of connection elements is disposed in a recessed hole in the main body portion.

12. The balance testing system of claim 9, wherein the connection elements are screws.

13. The balance testing system of claim 12, wherein the holes for the screws are disposed symmetrically about a circumference of the main body portion.

14. The balance testing system of claim 9, wherein the main body portion and the ring are formed as cylinders having a substantially same diameter and the extended insert portion is a cylinder having a smaller diameter than that of the main body portion and the ring.

* * * * *